Patented Nov. 4, 1941

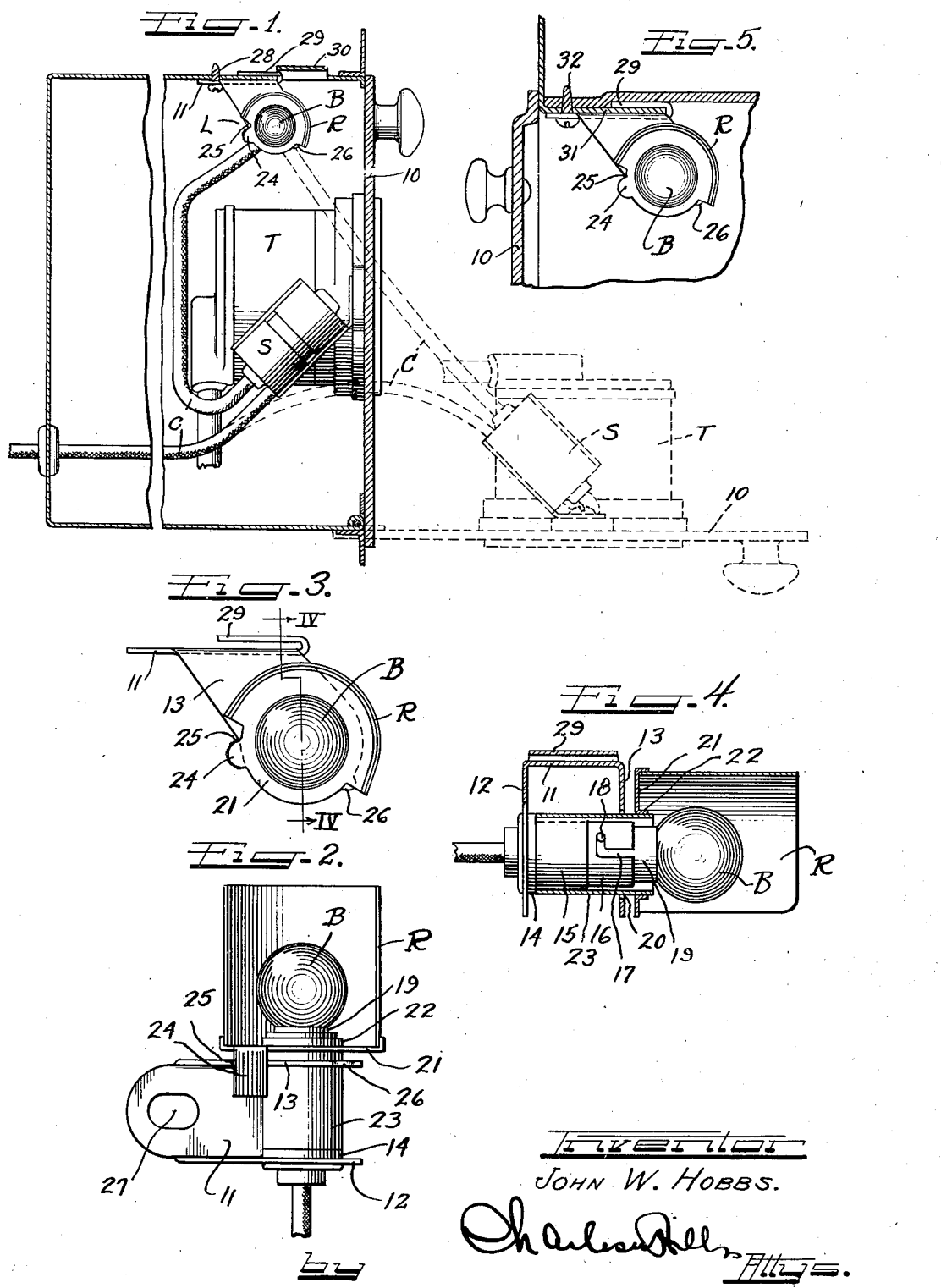
Nov. 4, 1941. J. W. HOBBS 2,261,622
COMBINATION READING AND AUTOMOBILE COMPARTMENT LIGHT
Filed April 21, 1941
Inventor
John W. Hobbs.

2,261,622

UNITED STATES PATENT OFFICE 2,261,622

COMBINATION READING AND AUTOMOBILE COMPARTMENT LIGHT

John W. Hobbs, Springfield, Ill., assignor to John W. Hobbs Corporation, Springfield, Ill., a corporation of Delaware Application April 21, 1941, Serial No. 389,538

4 Claims. (Cl. 240—7.1)

My invention relates to illuminating means for automobile compartments such as compartments mounted on the instrument board and utilized for storage of articles such as road maps, gloves, etc. Illuminating means for a compartment of this type is disclosed in my United States Letters Patent No. 2,228,456, dated January 14, 1941, and my present invention may be considered as being an improvement over the illuminating means disclosed in this patent.

In the illumination arrangement, such as disclosed in my patent referred to, the light from the lamp is directed at all times into the compartment for illumination of the compartment contents, and, when the compartment door is opened for closure of the lamp circuit, there is not sufficient light directed outwardly from the compartment for reading purposes, such as the consultation of maps. The important object of my present invention is therefore to provide means for the lamp so that adjustment may be made for reflecting of the light into the compartment, or for reflection of the light outwardly so that maps or other printed matter may be conveniently read.

My improvement concerns particularly the provision of a reflector structure for the lamp which may be conveniently manipulated, after opening of the door, for reflecting the light from the lamp into the compartment for illumination of the contents thereof, or for directing the light from the lamp to the outside of the compartment for reading or illuminating purposes outside of the compartment.

Another object of the invention is to produce a simple, economically manufactured lamp supporting unit with reflector attachment which may be readily secured at any desired point in the compartment for convenient manipulation and adjustment of the reflector for the desired light directioning.

The various features of my invention are incorporated in the structure shown on the drawing, in which drawing:

Figure 1 is a transverse section of an automobile compartment with the illuminating unit and its circuit controlling means mounted therein;

Figure 2 is a side view of the illuminating unit;

Figure 3 is an enlarged end view of the illuminating unit;

Figure 4 is a section on plane IV—IV of Figure 3; and

Figure 5 shows a modified arrangement.

Referring to Figure 1, the lighting unit L is located at the upper part of the compartment near the open end thereof which is normally closed by a door 10. A gravity actuated switch S is mounted to move with the door for opening of the lamp circuit C when the door is closed, or for closure of this circuit when the door is swung to open position, all in a manner as described in my patent referred to. The door may also support a clock T.

The supporting structure for the light bulb B comprises a bracket wall or base 11 having the parallel wings or flanges 12 and 13 extending therefrom. The wall 12 has an opening surrounded by an inwardly directed flange 14 which receives and secures a bushing or thimble 15 in which is mounted the tube 16 which forms a socket for the light bulb B. This socket tube has the usual bayonet slot 17 for receiving pins 18 extending from the base 19 of the bulb.

The thimble 15 receives only the inner portion of the socket tube 16 so as not to interfere with the cooperation of the pins 18 with the bayonet slot, but the socket tube extends a short distance outwardly through an opening 20 in the bracket wall 13.

The reflector structure comprises a reflector R of substantially semi-circular cross section and secured to and extending from a wall 21 having an opening surrounded by a flange 22 in which is secured the outer end of a tubular support or sleeve 23. This sleeve is of a diameter to fit over the thimble 15 for abutment against the flange 14 of the bracket wall 12, and the opening 20 in the bracket wall 13 is of sufficient diameter so that the sleeve may readily slip therethrough for engagement with the thimble, as plainly shown on Figure 4, the lamp bulb being withdrawn before the sleeve is inserted. After insertion of the sleeve the lamp bulb is re-inserted in the socket and the bulb will then form an outer stop for holding the reflector supporting sleeve in position. The engagement of the sleeve with the thimble is such that the reflector may be readily rotated for desired directioning of the light from the lamp bulb and will be held in adjusted position by the frictional engagement of the sleeve with the thimble. To facilitate convenient rotational adjustment of the reflector structure, the reflector supporting wall 21 has a portion deflected axially therefrom to provide a finger engageable wing or button 24, the wing being preferably a transverse curved section and knurled on its outer or convex side for friction engagement by the finger. The outer edges of the bracket wall 13 are preferably semi-circular and the wing or button 24 extends across the wall 13 which has stop points 25 and 26 engageable by the wing 24 to limit the rotational movement of the reflector structure.

The base wall 11 of the bracket structure is provided with an opening 27 for receiving a fastening member such as a screw 28 for securing the bracket structure in a desired location within the compartment. A tongue 29 may be provided on the base 11 to form a hook for engagement around a supporting edge. As shown on Figure 1, a portion 30 is deflected upwardly from the top wall of the compartment to leave an opening through which the tongue is slipped to extend over the top wall to assist the screw 28 to securely hold the bracket. Normally the reflector structure will be in position with the actuating wing 24 against the stop 25 so that the reflector R will direct the light from the lamp bulb into the compartment for illumination of the compartment contents, when the door 10 is swung down to its open position for closure of the lamp circuit C by the switch S. The driver can then readily locate the compartment contents, and if he desires to consult a road map or other printed matter he can conveniently rotate the reflector structure by means of the knurled wing or button 24 for setting of the reflector R for directing the light from the lamp bulb outwardly through the compartment doorway on to the map or other matter to be read.

As the thimble 15 terminates short of the bayonet slot in the socket tube 16, the clearance between the supporting sleeve 23 for the reflector structure and the bayonet slot is sufficient so that the pins 18 on the lamp base will not interfere with the adjustment of the reflector, and the reflector will not interfere with the withdrawal of the lamp bulb from the socket or the insertion of a lamp bulb therein.

In the modified arrangement shown on Figure 5, the flange 31 on the instrument panel extends below the top wall of the compartment and the tongue 29 of the bracket 11 is inserted between the flange and the top wall, the opening 27 of the bracket receiving the screws 32 which secures the flange to the compartment.

I have thus provided a simple and efficient illuminating unit for mounting within an automobile compartment which is readily adjustable by setting of its reflector structure for the directioning of the light from the lamp bulb into the compartment for illumination of the contents thereof or for directing the light of the bulb outwardly from the compartment for reading or other illuminating purposes.

I have shown a practical and efficient embodiment of the invention but I do not desire to be limited to the exact construction and arrangement shown and described as changes and modifications may be made without departing from the scope of the invention.

I claim as my invention:

1. An automobile compartment illuminating unit comprising a supporting bracket having opposed parallel walls, a lamp supporting socket structure extending between and secured to one of said walls, said other wall having an opening surrounding said socket structure, a reflector structure comprising a reflector and a supporting sleeve therefor extensible through said bracket wall opening for engagement with said socket structure for rotational movement thereon for adjustment of said reflector relative to a lamp bulb in said socket structure.

2. An automobile compartment illuminating unit comprising a supporting bracket having opposed parallel walls, a lamp supporting socket structure extending between and secured to one of said walls, said other wall having an opening surrounding said socket structure, a reflector structure comprising a reflector and a supporting sleeve therefor extensible through said bracket wall opening for engagement with said socket structure for rotational movement thereon for adjustment of said reflector relative to a lamp bulb in said socket structure, a finger engageable wing extending from the reflector structure across one of said bracket walls whereby said reflector structure may be readily rotatably adjusted, said bracket wall having stop points for engagement by said wing for limiting the rotational movement of said reflector structure.

3. An illuminating unit for installation within an automobile compartment comprising a supporting bracket having opposed parallel walls whose outer edges are semi-circular, a bushing secured to one of said walls and extending toward said other wall, a tubular lamp socket secured in said bushing, said other wall having an opening through which the outer end of said socket extends, a reflector structure comprising a reflector and a tubular supporting sleeve therefor projectible through said bracket wall opening for engagement with said bushing for rotational movement thereon for adjustment of said reflector relative to the lamp within said socket, and a finger engageable wing extending from reflector structure across the adjacent wall of said bracket whereby said reflector structure may be conveniently rotatably adjusted for the desired directioning of the light from the lamp, said wall over which said wing extends having stops for engagement by the wing for limiting the rotational movement of said reflector structure.

4. An automobile compartment illuminating unit comprising a supporting bracket having opposed parallel walls, a lamp supporting socket structure extending between and secured to one of said walls, said other wall having an opening surrounding said socket structure, a reflector structure comprising a reflector and a supporting sleeve therefor extensible through said bracket wall opening for engagement with said socket structure for rotational movement thereon for adjustment of said reflector relative to a lamp bulb in said socket structure, and a tongue on said bracket forming a hook for engagement around the edge of a wall of the compartment for holding the bracket in place.

JOHN W. HOBBS.